United States Patent
Babenko

(10) Patent No.: US 6,357,464 B2
(45) Date of Patent: *Mar. 19, 2002

(54) METHOD FOR REDUCING DISSIPATION RATE OF FLUID EJECTED INTO BOUNDARY LAYER

(75) Inventor: Victor V. Babenko, Kiev (UA)

(73) Assignee: Cortana Corporation, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/925,368

(22) Filed: Aug. 10, 2001

Related U.S. Application Data

(63) Continuation-in-part of application No. 09/698,144, filed on Oct. 30, 2000, which is a continuation-in-part of application No. 09/635,361, filed on Aug. 11, 2000, now Pat. No. 6,305,399, which is a continuation of application No. 09/223,783, filed on Dec. 31, 1998, now Pat. No. 6,138,704.

(51) Int. Cl.[7] .................................................. F17D 1/17
(52) U.S. Cl. ....................................... 137/13; 114/67 A
(58) Field of Search ........................... 137/13; 114/67 A

(56) References Cited

U.S. PATENT DOCUMENTS

| | | |
|---|---|---|
| 3,414,004 A | 12/1968 | Bankston |
| 3,502,103 A | 3/1970 | Verschuur |
| 3,601,079 A | 8/1971 | Giles et al. |
| 3,822,721 A | 7/1974 | Verschuur |
| 3,826,279 A | 7/1974 | Verschuur |
| 3,886,972 A | 6/1975 | Scott et al. |
| 4,186,679 A | 2/1980 | Fabula et al. |
| 4,756,326 A | 7/1988 | Johnston |
| 4,987,844 A | 1/1991 | Nadolink |
| 5,165,440 A | 11/1992 | Johnston |
| 5,376,697 A | 12/1994 | Johnston et al. |
| 5,388,905 A | 2/1995 | Ake et al. |
| 5,445,095 A | 8/1995 | Reed et al. |

OTHER PUBLICATIONS

McInville R M et al: "Analysis of large vortical structures in shear layers" AIAA Journal, Aug. 1985, USA vol. 23, No. 8, Aug. 1995, pp. 1165–1171.

Abstract of Japanese Publication No. 9–151914 published Oct. 1997.

Abstract of Japanese Publication No. 9–151913 Published Oct. 1997.

Primary Examiner—Gerald A. Michalsky
(74) Attorney, Agent, or Firm—Arnold International; Bruce Y. Arnold

(57) ABSTRACT

A method for ejecting a second fluid into the near-wall region of the boundary layer of a first fluid, so that the second fluid hugs the wall. This alone reduces drag by modifying the behavior of the near-wall structure, thereby reducing the frequency of burst and sweep cycles, even when the first and second fluids are identical. Further, one or more additives, such as polymer, surfactant, micro-bubbles, a combination thereof, and/or using a second fluid having an elevated temperature as compared to the temperature of the first fluid, may be used to achieve much greater drag reduction as well as lower additive diffusion rates than previously possible. The second fluid is ejected using a convex Coanda surface (7) and at a controlled velocity that is a small fraction of the velocity of the first fluid moving along the wall.

12 Claims, 6 Drawing Sheets

METHOD FOR REDUCING DISSIPATION RATE OF FLUID EJECTED INTO BOUNDARY LAYER

CROSS-REFERENCE TO RELATED APPLICATIONS

This application is a continuation-in-part of 09/698,144 filed Oct. 30, 2000, which is a continuation-in-part of 09/635,361 filed Aug. 11, 2000, now U.S. Pat. No. 6,305,399, which is a continuation of 09/223,783 filed Dec. 31, 1998, now U.S. Pat. No. 6,138,704, the benefits of priority to which are hereby claimed under 35 U.S.C. § 120.

BACKGROUND OF INVENTION

Injection of additives such as microbubbles or high molecular weight materials such as polymers into the boundary layer of a fluid flow has been shown to reduce skin friction drag significantly for both vessels moving relative to water and for pipeline applications. The microbubbles or large polymer molecules interact with the turbulent activity in the near-wall region, absorbing energy and reducing the frequency of burst (high energy fluid moving away from the wall) and sweep (low energy fluid replacing the high energy fluid in the near-wall region) cycles. The reduced burst frequency results in less energy dissipation from the wall and can result in skin friction drag reductions up to 80%. Experiments have shown that the efficacy of polymer to molecules for drag reduction is closely related to their molecular weight, their location in the boundary layer, and the degree to which they have been unwound, aligned, and stretched (i.e., "conditioned").

In the past, polymer mixture ejectors have been simple slots that ejected a mixture/solution of polymer and a fluid at an angle to the wall. To attain high drag reduction for a reasonable distance downstream with this ejection approach, large quantities and high concentrations of polymers must be ejected in order to flood the entire boundary area, creating a "polymer ocean" effect in the boundary layer. The high polymer consumption rates of these systems have made them impractical for many drag reduction applications.

Fluids containing other substances than high molecular weight materials, e.g. microbubbles, surfactant, etc., as well as fluids with or without additive which are heated so as to achieve a lower viscosity in the viscous sublayer, have been used in prior art attempts to reduce surface friction drag. These, however, each require very large amounts of additive or quantities of heated fluid. To be useful for practical applications, a more efficient method for ejecting additive(s) or fluids, such as low viscosity or heated fluids, for drag reduction needs to be devised.

Another method to reduce skin friction is to impose on the surface narrow microgrooves, commonly referred to as riblets. The riblets also affect the development of turbulent structures in the near-wall region and thereby reduce the burst frequency. While the technique does not require the expenditure of consumables such as polymers, the level of drag reduction is more modest than with additives, usually about 6 to 12 percent. Further, such systems are not effective for marine surfaces that are exposed to microfouling from biological slimes. Since slimes begin to form in a matter of hours, riblets are only practical for marine surfaces that can be regularly cleaned. Thus, a technique to affect the development of turbulence which does not require the expenditure of additives but which is tolerant of the marine environment also will be useful even if the effect is modest relative to polymer drag reduction.

BRIEF SUMMARY OF THE INVENTION

The present invention enables the efficient ejection of fluid mixtures/solutions containing a drag-reducing additive or additives into the near-wall region of a boundary layer of a fluid flow in order to reduce drag. A first object of the invention is to enable drag to be reduced for a first fluid moving relative to a surface by ejecting a second fluid into the near-wall region of the boundary layer of the surface such that the second fluid retards or inhibits the "burst" and "sweep" cycles, as discussed above. The second fluid may or may not: (1) be the same fluid as the first fluid, (2) be of lower viscosity (e.g., elevated in temperature) relative to the first fluid, and/or (3) contain one or more drag-reducing substances as an additive in mixture or solution. A second object of the invention is to release a drag-reducing substance only into the near-wall region of the boundary layer, by ejecting it substantially parallel with the streamlines of the boundary layer. A third object of the invention is to extend the time the drag-reducing substance is operative in the near-wall region of the boundary layer by creating low pressure regions immediately adjacent the wall. When a drag-reducing substance is added to the second fluid, the drag-reducing substance may comprise a mixture/aqueous solution of high molecular weight polymer, surfactant, gas micro-bubbles, or any combination thereof. When the additive includes polymer, a fourth object of the invention is to condition the polymer molecules prior to ejection so that drag reduction occurs almost immediately upon ejection into the first fluid.

When a drag-reducing additive that includes polymer is used, the present invention preconditions the drag reducing mixture/solution for improved drag reduction performance using a unique arrangement of flow area restrictions, as well as by employing dimples, grooves and elastomeric materials. The dimples, grooves and flow area restrictions are sized relative to one another and to the Reynolds number of the flow for optimal polymer molecule conditioning (unwinding, aligning with the flow and stretching) so as to provide optimal drag reduction after ejection into the fluid flow.

The present invention uses a new approach to ejecting the second fluid so that it minimizes disruption of the boundary layer of the first fluid. This aspect of the invention employs a convex Coanda surface on the downstream side of a slot ejector and controls the ejected velocity so as to be a small fraction of the flow velocity of the first fluid past the surface, thereby enabling the stream lines of the second fluid to be nearly parallel with the streamlines of the first fluid.

The present invention also uses a new approach to structuring the flow in order to reduce migration/dissipation of the second fluid away from the near-wall region of the downstream wall. This is achieved by one or more ejectors, each having a carefully designed chamber under the slot. The upstream wall of the chamber has the surface curvature and features that establish a duct-like system of longitudinal (i.e., in the direction of the flow) Görtler vortices. Görtler vortices are formed by the centrifugal effect of a fluid flow that is given angular velocity by a concave surface. The duct-like system of Görtler vortices formed by the present invention mimic the spacing, but have the opposite rotation, of the naturally occurring quasi-longitudinal vortex pairs in the boundary layer. The pairing of naturally occurring quasi-longitudinal vortex pairs is such that they migrate from the wall and are believed to contribute to the development of bursts and sweeps that account for a large portion of hydrodynamic drag. The vortex pairs, created by the upstream wall of the chamber, have an inverted orientation relative to the downstream wall and thus opposite signs of rotation that cause the vortex pairs to hug the downstream wall as they pass along it after being shed from the chamber. This advantageously causes the second fluid or drag-reducing substance that has been ejected into the near-wall region of the boundary layer of a first fluid flowing by the wall to remain in the near-wall region. It also enables drag reduction to be achieved (by reducing the frequency of burst and sweep cycles) when the second fluid contains no additives, is identical in temperature, and is the same type fluid as the first fluid.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention achieves more effective and more efficient drag-reducing substance mixture/solution ejection by releasing a drag-reducing substance mixture/solution into the near-wall region of the boundary layer and by controlling the characteristics of the mixture/solution flow so that the mixture/solution becomes effective more quickly and remains for a longer period of time in the near-wall region. By producing a mixture/solution with flow characteristics that adhere it to the wall, the ejector extends the drag-reducing substance residence time in the near-wall region before it is diffused into the surrounding fluid, and thus reduces additive consumption of a drag reduction system.

Figure 1:
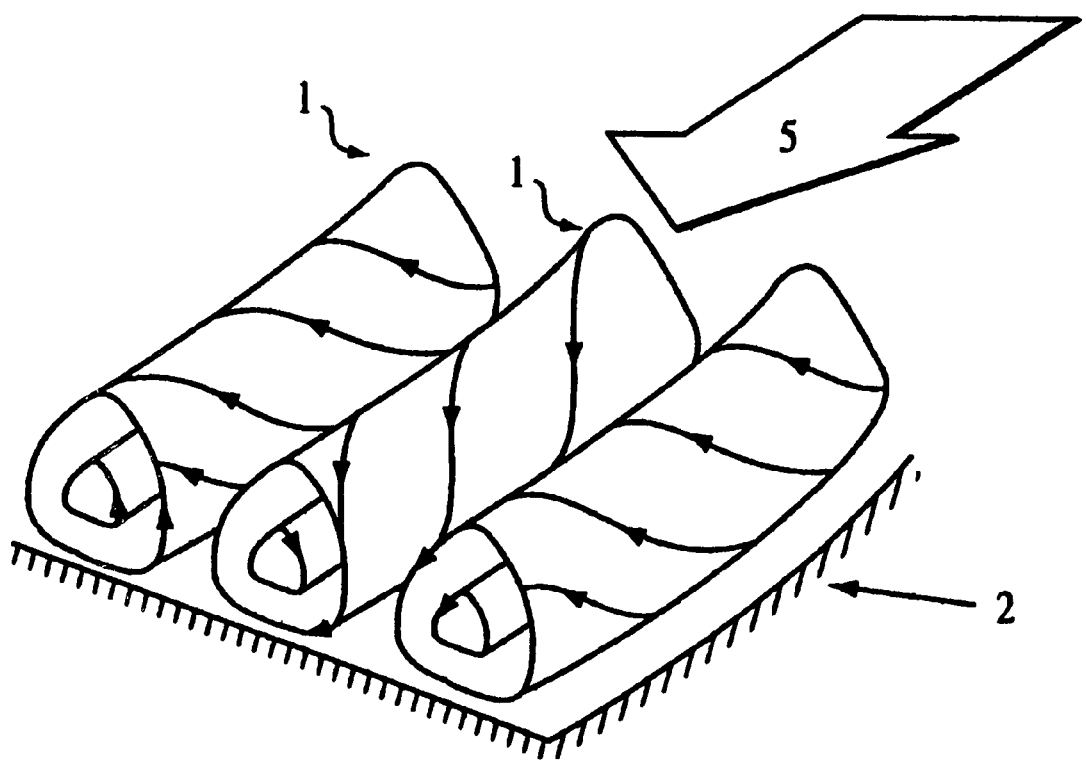
FIG. 1 depicts Görtler vortices forming due to centrifugal forces caused by drag on a concave surface.

Görtler vortices are formed by the centrifugal effect of a subtantially "free" (meaning relatively unconstrained, unlike flow in a pipe or duct of constant cross-section) flow that is given angular velocity by a concave surface. FIG. 1 depicts naturally occurring, quasi-longitudinal Görtler vortices 1 forming due to centrifugal forces caused by the flow 5 over a concave surface 2. The surface features of the ejector of the present invention create Görtler vortices that mimic the spacing of the naturally occurring quasi-longitudinal vortex pairs in the boundary layer, but they are produced on the upstream wall and thus are inverted in orientation relative to the downstream wall. This occurs due to the downstream wall surface normal being inverted relative to the surface normal of the chamber wall where the vortices are shed. The pairing of naturally occurring quasi-longitudinal vortex pairs is such that pressure differentials produced cause them to migrate from the wall at which they are formed and are believed to contribute to the development of bursts and sweeps that account for a large portion of hydrodynamic drag.

Figure 2A:
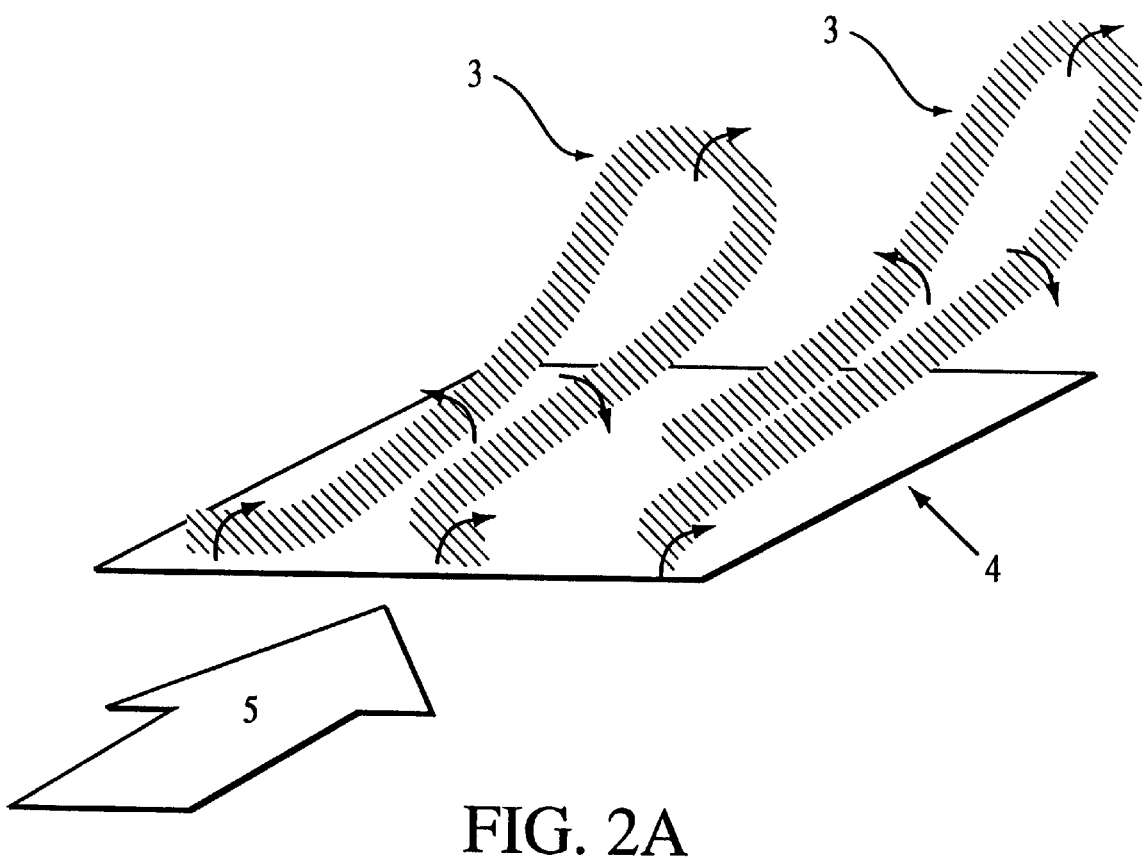
FIG. 2A illustrates, in isometric view, the formation process of naturally generated quasi-longitudinal vortex pairs which, as is well known in the art, evolve in the near-wall region of a turbulent boundary layer.
Figure 2B:
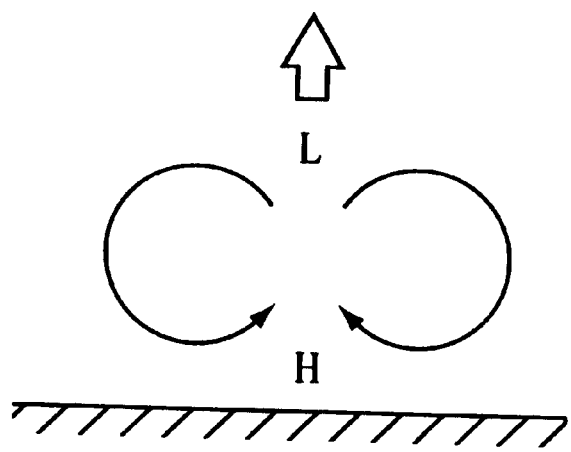
FIG. 2B is a cross-sectional view of a fully developed, Görtler vortex pair adjacent a surface from which, as is well known in the art, occur in an unrestricted flow of a fluid over a concave surface or where a cross-sectional area of a restricted flow temporarily increases in the region of the concave surface, such as in a chamber, so as to allow paired Görtler vortices to form.
Figure 2C:
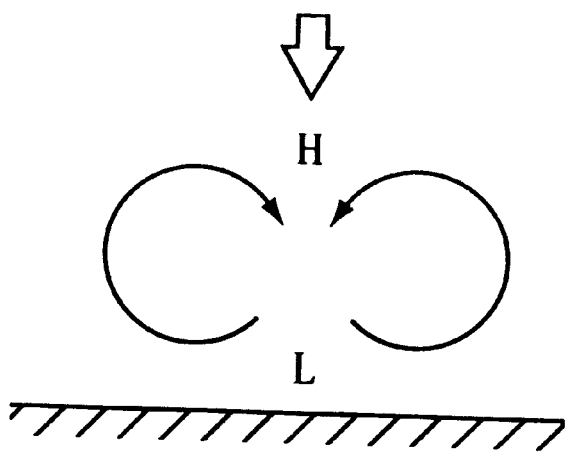
FIG. 2C is a cross-sectional view of a fully developed, Görtler vortex pair which has been shed by an upstream surface of opposite orientation and now is adjacent a downstream surface, and which rotate with directions opposite to the naturally occurring vortex pair illustrated in FIG. 2B.

FIG. 2A depicts a schematic view of quasi-longitudinal vortex pairs which are created in the near-wall region of turbulent flow. It is generally accepted that flow 5 over a stationary surface 4 creates transverse structures which become distorted into hairpin-shaped vortices 3 near the wall. The quasi-streamwise "legs" of each hairpin-shaped vortex produce a pressure differential normal to the wall that makes the vortex pair migrate away from the surface 4. FIG. 2(b) is a transverse cross-sectional schematic of such a vortex pair inducing a pressure differential that will move it away from the wall. The "H" represents a local higher pressure region, and the "L" represents a local lower pressure region. In contrast to a naturally occurring vortex pair, the Görtler vortex pairs generated by the ejector of the present invention are paired and spaced so that the pressure differentials they create causes them to hug a downstream wall surface. FIG. 2C is a transverse cross-sectional view of a vortex pair which creates a pressure differential that drives the vortex pair in a direction towards the downstream, inverted wall, thereby causing the vortex pair to hug the downstream, inverted wall. Note that the inverted, downstream wall surface shown in 2(c) has been drawn as having the same orientation as the wall in FIG. 2B. If FIG. 2C were rotated 180 degrees so that the wall surface is, in fact, inverted, one can see that the situation is equivalent to the wall in FIG. 2B being above the vortex pair. Because the vortices of such a pair hug the downstream wall, they help maintain the ejectant (with or without additive) that has been ejected by the ejector into in the near-wall region, and thereby reduce the occurrence of bursts and sweeps. Hereinafter, the ejector used with the method of the present invention will be called a "vortex duct" ejector because of its innovative use of vortex structures to control polymer mixture/solution dissipation.

Figure 3:
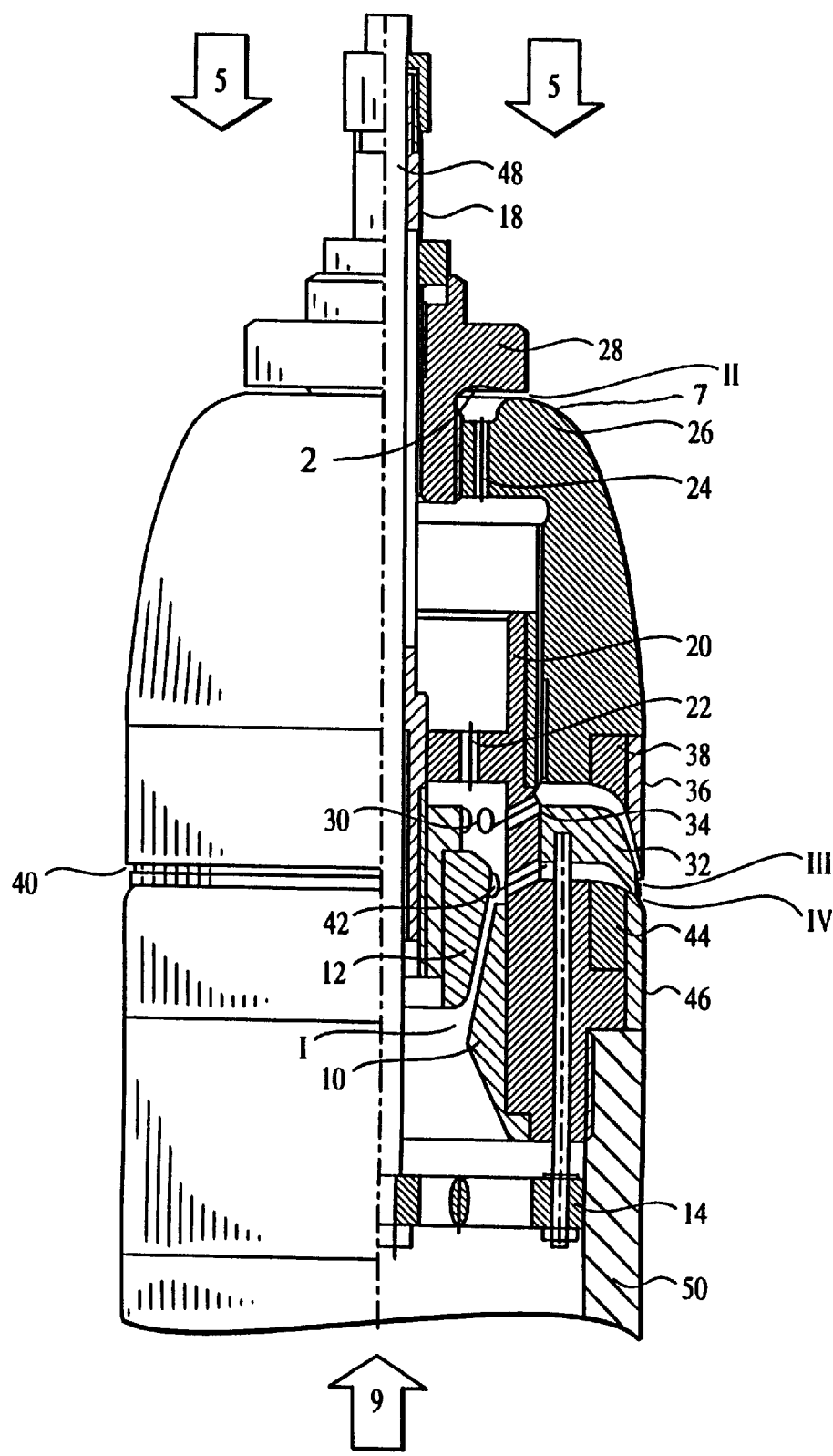
FIG. 3 depicts a side view of a vortex ejector used to practice the method of the invention, with the lower portion thereof being a cross-sectional view which shows the inner components of the vortex duct ejector.

FIG. 3 illustrates a vortex duct ejector that may be used in practicing the method of the present invention. Additive mixture/solution 9 flows into the ejector from the left, moving toward slot 1. In this embodiment, the boundary layer to be injected with additive mixture/solution envelops the vortex duct ejector and the flow is from right to left, just as if the ejector were on a body moving to the right in a stationary medium. Additive mixture/solution is ejected from the slots II, III, and IV into the boundary layer of the ejector body. Optimal solution concentrations and volume flow rates are determined as required for each application.

Additive mixture/solution flowing into the ejector from the left is directed toward slot I by diffuser 10 and cone 12. Interaction between one or more vanes (not labeled) attached to the framework 14 reduces the irregularity of the flow. As the flow passes through slot I, dimples in cone 12 and longitudinal slots in diffuser 10 create quasi-longitudinal vortices.

Figure 4:
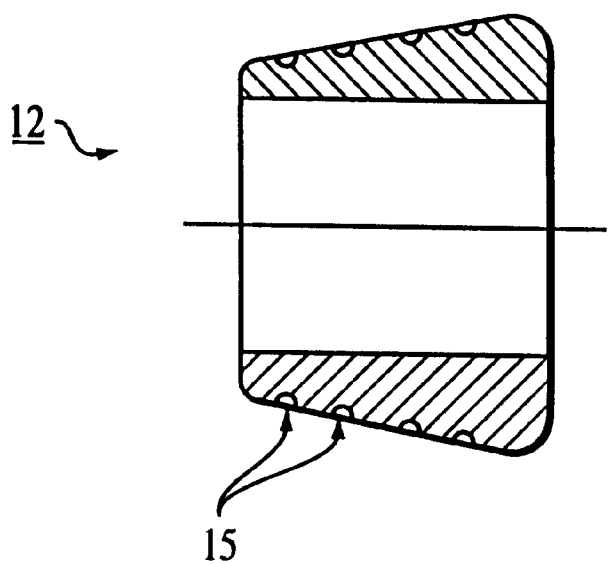
FIG. 4 illustrates, in cross-sectional view, a cone component of the ejector shown in FIG. 3.
Figure 5:
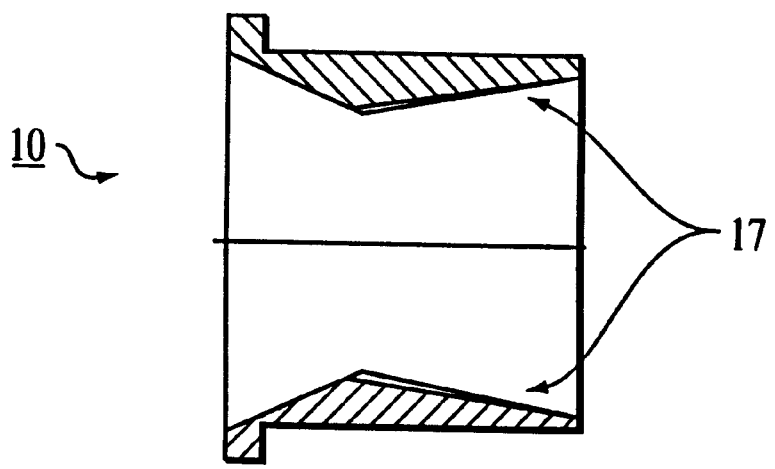
FIG. 5 illustrates, in cross-sectional view, a diffuser component of the ejector shown in FIG. 3.

FIG. 4 is a cross-sectional view of the cone 12, illustrating the dimples 15 in cone 12. FIG. 5 is a cross-sectional view of the diffuser 10, illustrating the longitudinal slots 17 in diffuser 10. Interaction of vortices created by the dimples 15 and slots 17 promotes further unwinding, aligning, and stretching of the polymer molecules in the mixture/solution. The width of slot I can be adjusted, or varied, by sliding the central tube 18 with attached cone 12 longitudinally. The materials and features of the diffuser 10 and cone 12 can also be changed or modified to alter the vortical structures. The throttled and conditioned flow then passes out of slot I and through a system of passageways in framework 20. The size of the passageways in framework 20 governs the shape of the dimples on cone 12 according to Condition (1):

$$0.25\, d_{passageways20} \leq d_{dimples12} \leq 0.5\, d_{passageways20} \quad \text{Condition (1)}$$

where $d_{passageways20}$ is the diameter of the passageways in framework 20 and $d_{dimples12}$ is the diameter of the dimples in cone 12. The depth (h) of the dimples is given by Equation (1):

$$h_{dimples12} = 0.25\, d_{dimples12} \quad \text{Equation (1)}$$

where $h_{dimples12}$ is the depth of the dimples in cone 12, and $d_{dimples12}$ is as defined above. In addition, the grooves in diffuser 10 are defined by Equations (2) and (3):

$$B_{grooves10} = d_{dimples12} \quad \text{Equation (2)}$$

$$W_{grooves10} = h_{grooves10} = 0.25\, d_{dimples12} \quad \text{Equation (3)}$$

where $B_{grooves10}$ is the center-to-center distance between the grooves in the diffuser 10, $W_{grooves10}$ is the width of each groove in diffuser 10, and $h_{grooves10}$ is the depth of each groove in diffuser 10.

Vortex formation can be enhanced by fabricating the cone (12) from an elastomeric material with characteristics what satisfy the equation $$(E/\rho)^{1/2} = 0.5\, U_{28} \quad \text{Equation (4)}$$

where E is the modulus of elasticity, $\rho$ is the density, and $U_{28}$ is the velocity of the exterior flow. For additional vortex enhancement, one may use anisotropic elastomeric material characterized as follows $$2 \leq E_{long}/E_{xverse} \leq 5 \quad \text{Condition (2)}$$

where $E_{long}$ is the longitudinal modulus of elasticity and $E_{xverse}$ is the transverse modulus of elasticity.

The system of passageways in framework 20 can be divided into four groups. The first group 22 passes solution in the longitudinal direction through a second set of passageways 24 in the fairing 26 having a diameter one-half that of the dimples in cone 12 and out into the flow path through slot II. Slot II is the laminar region ejector, and it is intended to thicken and condition the boundary layer upstream of the slots III and IV. The concave shape of the upstream surface of the under-slot-chamber formed by stopper 28 creates longitudinal Görtler vortices and the shape formed by fairing 26 (FIG. 3) provides a convex Coanda surface. The surfaces of slot II are parallel at the aperture. As the flow from slot IT enters the boundary layer, it is characterized by longitudinal Görtler vortex structures immediately adjacent an attached flow coming off the downstream convex Coanda surface. These longitudinal Görtler vortices condition the flow upstream of slot III. Slot II's contribution to thickening and conditioning the boundary layer reduces disturbances caused by the ejected flow at slots III and IV.

Figure 6:
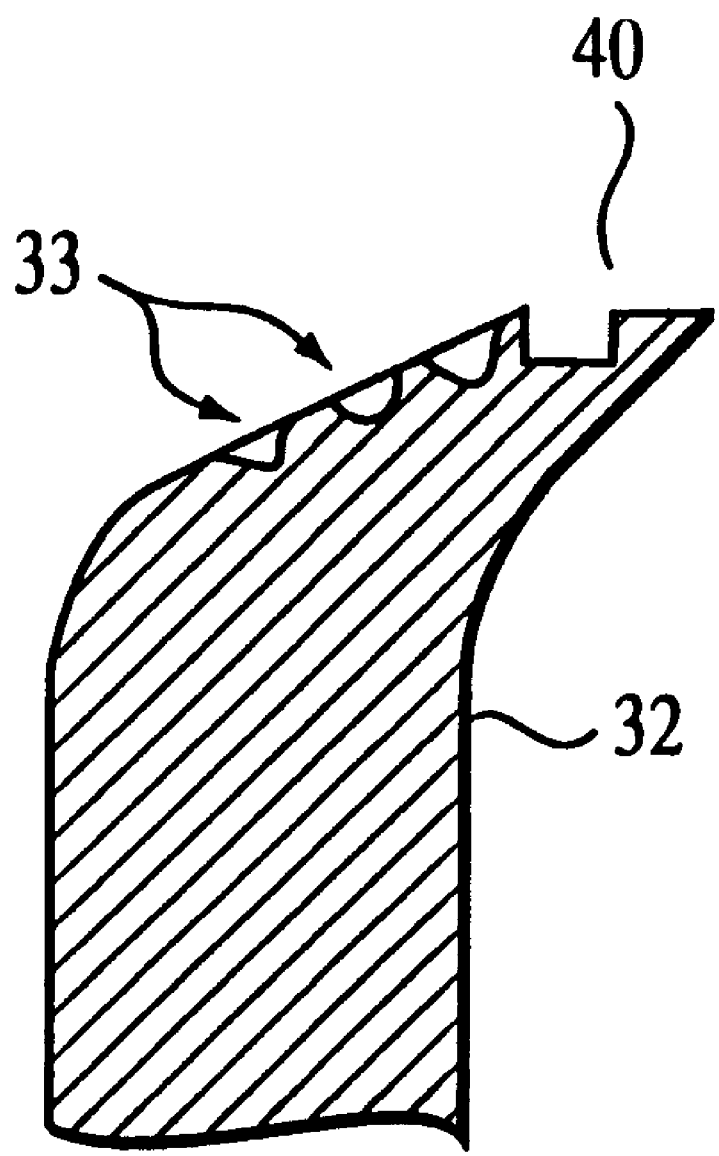
FIG. 6 illustrates, in cross-sectional view, a portion of an ejector ring.

Another group of passageways 30 passes the mixture/solution obliquely through the framework 20, the fairing 26, and rings 32, 34, 36 and 38 to exit from slot III. The curvature of the upstream surface of the chamber under slot III is concave in order to produce a system of longitudinal Görtler vortices, and these vortices are then amplified by dimples 33 on an elastic downstream surface of ejector ring 32. FIG. 6 illustrates, in cross-sectional view, a portion of such an ejector ring 32.

The dimensions and pitch of the dimples in ring 32 are given by:

$$\lambda_{dimples32} = d_{dimples32} = ((7.19 \times 10^5)/Re_x) + (3.56 \times 10^{-5})(Re_x) + 1.71 \quad \text{Equation (5)}$$

and $$h_{dimples32} \leq 0.5\, d_{dimples32} \quad \text{Equation (6)}$$

where $\lambda_{dimples32}$, $d_{dimples32}$ and $h_{dimples32}$ are the pitch, diameter and depth, respectively, in wall units y*, of the dimples 33 in ring 32, and $Re_x$ is the Reynolds number of the water flow immediately downstream of slot IV. As is well known in the art, wall units are a non-dimensional measurement of distance from a wall. They can be expressed as a length dimension using the following equation.

$$y = (y^* \, v)/\mu \quad \text{Equation (7)}$$

where y is a dimensioned length, v is the kinematic viscosity of the fluid and $\mu$ is the friction velocity of the fluid.

Fabricating ring 32 from elastomeric material can further enhance the Görtler vortices forming in the chamber under slot III. If an elastic material is chosen, its characteristics should satisfy Equation (4), above. For additional enhancement effects, one may use anisotropic elastomeric material characterized by Condition (2), above.

When ring 32 is located in a more upstream position than that illustrated in FIG. 3, such that its transverse groove is located beneath the edge of ring 36, the transverse groove 40 creates a stationary transverse vortex within transverse groove 40. The low pressure created by this transverse vortex draws the flow ejected from slot III, including the longitudinal Görtler vortices, against the wall and stabilizes the flow ejected from slot III. When ring 32 is located farther from ring 36, the transverse groove generates a series of transverse vortex rings, which escape and migrate downstream with the flow. The frequency at which these transverse vortices are released can be controlled by periodic motion of rings 32 and 34 (i.e., by oscillating central rod 48 which indirectly supports ring 34 via frame 14), or by changing the elastic characteristics of the ring 32 material. The dimensions of the transverse groove are given by:

$$w_{xverse40} = h_{xverse40} = 0.5\, d_{dimples32} \quad \text{Equation (8)}$$

where $w_{xverse40}$ is the width and $h_{xverse40}$ is the depth, respectively, of the transverse groove 40.

The last group of passageways 42 in framework 20 passes the additive mixture/solution obliquely into the space between adjustable rings 32, 34, 44 and 46 and out into the flow stream through slot IV. As with slot III, the curvature of the upstream surface of the chamber under slot IV creates a system of longitudinal Görtler vortices that are amplified by the dimples in rings 44 and 46. These Görtler vortices interact with the vortices coming from slot III to form longitudinal waveguides that act to retain the polymer solution near the wall. The dimensions and spacing of the dimples in rings 44 and 46 are governed by the same equations as the dimples in rings 32 and 34.

The width of slots I, III and IV can be either adjusted or oscillated by sliding cone 12 and/or the rings 32 and 34 longitudinally. Cone 12 is articulated on the end of tube 18, and rings 32 and 34 are articulated by the central rod 48 via fasteners to frame 14. By adjusting the slot widths, one can vary the ejection velocity of the additive mixture/solution. The most effective drag reduction usually occurs when the ejection velocity is in a range between 5% and 10% of the free stream velocity. The ejector body 50 and slot widths should be adjusted to provide an additive mixture/solution flow velocity in this range for the desired mixture/solution flow rate. An entirely different slot structure can be achieved by removing rings 32 and 34 and replacing rings 44 and 46 with rings featuring longitudinal slots (not illustrated). The longitudinal slots are positioned at an approximate multiple of the spacing of the naturally occurring quasi-longitudinal vortex pairs and create high-energy longitudinal vortices.

Of course, the ejector used to of the present invention need not be limited to the embodiment specifically illustrated. Indeed numerous variations of the ducted vortex ejector are possible. For example, rings 32, 34, 44 and 46 may be replaced with rings having different material and structural characteristics. Rather the scope of the invention shall be defined as set forth in the following claims and their legal equivalents. Various modifications will occur to those skilled in the art as a result of reading the above description, and all such modifications as would be obvious to one ordinary skill in the art are intended to be within the spirit of the invention disclosed.

What is claimed is:

1. A method of reducing the dissipation rate of a second fluid ejected into the boundary layer of a first fluid flowing relative to a first surface, said method comprising the following steps:

(a) forming pairs of Görtler vortices, using an upstream concave surface that forms a chamber under the first surface, wherein the vortices are shed, ejected, and flow downstream along the first surface;

(b) releasing the second fluid into a region consisting substantially of only the near-wall region of a boundary layer of the first fluid by causing the second fluid to flow over a convex Coanda surface as it enters the flow path of the first fluid, said convex Coanda surface being located on the downstream side of a slot through which the second fluid enters the flow path; and (c) controlling the ejection velocity of the second fluid such that the convex Coanda surface directs the flow of the second fluid into the first fluid so that the flow lines of second fluid are substantially parallel to the flow lines of the first fluid.

2. The method of claim 1, and further including:

prior to release of the second fluid into the first fluid, adding a drag-reducing additive to the second fluid.

3. The method of claim 2, and further including, prior to release of the second fluid containing a drag-reducing additive, conditioning the drag-reducing additive by using fluid shear forces to cause the second fluid to flow between surfaces having conditioning means to thereby cause any high molecular weight, drag-reducing molecules in said second fluid to be in immediate condition for reducing drag.

4. The method of claim 1, and further comprising: heating the second fluid prior to release of the second fluid into the first fluid.

5. The method of claim 2, and further including heating the second fluid prior to release of the second fluid into the first fluid.

6. The method of claim 1, wherein the primary constituent of the first fluid is a hydrocarbon.

7. The method of claim 1, wherein the primary constituent of the second fluid is the same as the primary constituent of said first fluid.

8. The method of claim 1, wherein the primary constituent of the first fluid and the primary constituent of the second fluid is water.

9. The method of claim 2, and further including the step of extending the time the drag-reducing substance remains in the near-wall region by creating a stationary transverse vortex using a transverse groove downstream from the convex Coanda surface.

10. The method of claim 1, and further including using an elastomeric material downstream from the convex Coanda surface in order to enhance the Görtler vortices.

11. The method of claim 10, wherein the elastomeric material includes dimples in order to amplify the Görtler vortices.

12. A method of causing a drag-reducing substance that is released into the boundary layer of a fluid flowing relative to a first surface to remain in the immediate vicinity of said first surface, said method comprising the following step:

causing fluid to flow over a concave surface located on an upstream wall of a slot ejector which releases the drag-reducing substance into said first fluid, said slot ejector including a cross-sectional area that temporarily increases in the region of the concave surface so as to allow paired Görtler vortices to form and flow downstream, said Görtler vortices having rotations, relative to the first surface, that are opposite to the rotational directions of naturally-occurring Görtler vortex pairs formed by the first surface, whereby lower pressure regions are produced in the boundary layer so as to cause the released drag-reducing substance to remain in the vicinity immediately adjacent said first surface while said vortices are operative.

* * * * *

UNITED STATES PATENT AND TRADEMARK OFFICE
CERTIFICATE OF CORRECTION

PATENT NO.     : 6,357,464 B2
DATED          : March 19, 2002
INVENTOR(S)    : Babenko It is certified that error appears in the above-identified patent and that said Letters Patent is hereby corrected as shown below:

Title page,
Item [57], ABSTRCT,
Line 7, change "micro-bubbles" to -- microbubbles --;

Column 1,
Line 28, change "polymer to" to -- polymer --;
Line 43, change "e.g." to -- e.g., --;

Column 2,
Line 21, change "adjacent the wall" to -- adjacent to the wall --;
Line 25, change "micro-bubbles" to -- microbubbles --;
Line 31, change "drag reducing" to -- drag-reducing --;
Line 48, change "stream lines" to -- streamlines --;
Line 55, change "has the surface" to -- has a surface --;

Column 3,
Line 27, change "developed, G" to -- developed, --;
Line 28, change "örtler " to -- Görtler --;
Line 34, change "developed, G" to -- developed, --;
Line 35, change "örtler " to -- Görtler --;

Column 4,
Line 38, change "2(c)" to -- FIG. 2C --;
Line 44, change "into in the" to -- into the --;
Line 53, change "slot 1" to -- slot I --;

Column 5,
Line 1, change "view of the cone" to -- view of cone --;
Line 39, change "what" to -- that --;
Line 42, change the equation to:
-- $(E/\rho)^{1/2} = 0.5\ U_\infty$ . . . Equation (4) --;
Line 46 change "$U_{28}$" to -- $U_\infty$ --;
Line 66, change "IT enters" to -- II enters --;

UNITED STATES PATENT AND TRADEMARK OFFICE
CERTIFICATE OF CORRECTION

PATENT NO. : 6,357,464 B2
DATED : March 19, 2002
INVENTOR(S) : Babenko

It is certified that error appears in the above-identified patent and that said Letters Patent is hereby corrected as shown below:

Column 6,
Line 18, change the equation to:
-- $\lambda_{dimples32} = d_{dimples32} = ((7.19 \times 10^5) / Re_x) + (3.56 \times 10^{-5})(Re_x) + 1.71 \quad \ldots \text{Equation (5)}$ --;

Column 7,
Line 27, change "used to of" to -- used in --;
Line 38, change "ordinary" to -- of ordinary --;

Column 8,
Line 1, change "of second" to -- of the second --;
Line 12, change "to be in immediate condition for" to -- to be immediately in the condition for --; and
Line 55, change "adjacent said" to -- adjacent to said -- .

Signed and Sealed this

Twenty-ninth Day of October, 2002

Attest:

JAMES E. ROGAN
*Attesting Officer*     *Director of the United States Patent and Trademark Office*